(12) United States Patent
Krause

(10) Patent No.: US 10,248,331 B2
(45) Date of Patent: Apr. 2, 2019

(54) DELAYED READ INDICATION

(71) Applicant: HEWLETT PACKARD ENTERPRISE DEVELOPMENT LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/313,736

(22) PCT Filed: Jul. 23, 2014

(86) PCT No.: PCT/US2014/047760
§ 371 (c)(1),
(2) Date: Nov. 23, 2016

(87) PCT Pub. No.: WO2016/014046
PCT Pub. Date: Jan. 28, 2016

(65) Prior Publication Data
US 2017/0185320 A1  Jun. 29, 2017

(51) Int. Cl.
*G06F 3/06* (2006.01)
*G06F 13/24* (2006.01)

(52) U.S. Cl.
CPC ............ *G06F 3/0613* (2013.01); *G06F 3/068* (2013.01); *G06F 3/0655* (2013.01); *G06F 13/24* (2013.01)

(58) Field of Classification Search
CPC ...... G06F 3/0613; G06F 3/0655; G06F 3/068; G06F 13/24
See application file for complete search history.

(56) References Cited

U.S. PATENT DOCUMENTS 5,127,014 A   6/1992  Raynham
5,566,304 A  10/1996  Regal
5,987,555 A  11/1999  Alzien et al.
(Continued)

FOREIGN PATENT DOCUMENTS

WO   WO-2008014494 A2   1/2008
WO   WO-2009026196 A1   2/2009
(Continued)

OTHER PUBLICATIONS

International Search Report & Written Opinion received in PCT Application No. PCT/US2014/047760, dated Mar. 2, 2015, 9 pages.
(Continued)

*Primary Examiner* — Eric T Oberly
(74) *Attorney, Agent, or Firm* — Trop, Pruner & Hu, P.C.

(57) ABSTRACT

A requester sends, to a responding component, a request to cause the responding component to perform a computation. The requester sends, to the responding component, a delayed read indication, where the delayed read indication indicates that a result of the computation is not to be returned to the requester from the responding component until a data value at a target address of the delayed read indication has changed. The requester receives, from the responding component, an acknowledgment of the delayed read indication, and after receiving the acknowledgment, receives a response to the request without the requester sending another request to the responding component.

20 Claims, 3 Drawing Sheets

(56) References Cited

U.S. PATENT DOCUMENTS

| | | |
|---|---|---|
| 6,199,131 B1 | 3/2001 | Melo et al. |
| 6,349,390 B1 | 2/2002 | Dell et al. |
| 6,742,074 B2 | 5/2004 | Jeddeloh |
| 6,832,254 B1* | 12/2004 | Scoggins .............. H04L 29/06 709/223 |
| 7,266,710 B1 | 9/2007 | Cooper |
| 7,458,000 B2 | 11/2008 | Gorman et al. |
| 8,122,265 B2 | 2/2012 | Radhakrishnan et al. |
| 8,161,356 B2 | 4/2012 | Bains et al. |
| 8,713,252 B1 | 4/2014 | de la Iglesia et al. |
| 2003/0009721 A1 | 1/2003 | Hsu |
| 2004/0243886 A1 | 12/2004 | Klein |
| 2005/0055594 A1 | 3/2005 | Doering et al. |
| 2008/0082766 A1 | 4/2008 | Okin |
| 2008/0177929 A1 | 7/2008 | Gower |
| 2008/0195831 A1* | 8/2008 | Tsukamoto ........... G06F 3/0611 711/167 |
| 2009/0070553 A1 | 3/2009 | Wallach et al. |
| 2012/0317352 A1 | 12/2012 | Kang et al. |
| 2013/0139008 A1 | 5/2013 | Kalyanasundharam |
| 2014/0208144 A1 | 7/2014 | Ma |
| 2014/0281810 A1 | 9/2014 | Gifford et al. |
| 2015/0135183 A1* | 5/2015 | Kipp .................... G06F 9/46 718/103 |

FOREIGN PATENT DOCUMENTS

| | | |
|---|---|---|
| WO | WO-2013028849 A1 | 2/2013 |
| WO | WO-2015116077 A1 | 8/2015 |
| WO | WO-2015116078 A1 | 8/2015 |
| WO | WO-2015116079 A1 | 8/2015 |
| WO | WO-2015116080 A1 | 8/2015 |
| WO | WO-2016014046 | 1/2016 |

OTHER PUBLICATIONS

Vo, H. et al., "A Case for OS-friendly Hardware Accelerators," (Research Paper), Jul. 9, 2013, 8 pages, available at http://www.eecs.berkeley.edu/~krste/papers/osaccel-wivosca2013.pdf.

Hur, I., et al.; "A Comprehensive Approach to DRAM Power Management"; Conference: High Performance Computer Architecture; Mar. 2008; IEEE 14th International Symposium; 12 pages.

Intel Enterprise Platforms and Services Division, Intel Server Board S5500B0—Technical Product Specification, Revision 1.8, Jun. 2011 (162 pages).

Kumar, M., et al; "The Intel Xeon Processor 7500 Series, Advanced Reliability for Intel Xeon Processor-based Servers"; Version 1.0; Mar. 2010; 12 pages.

Manu Awasthi, "Efficient Scrub Mechanisms for Error-Prone Emerging Memories," High Performance Computer Architecture, IEEE 18th Int'l Symposium, Feb. 25-29, 2012, 12 pages.

PCT/ISA/KR, International Search Report and Written Opinion, dated Jul. 15, 2016, PCT/US2015/055976, 11 pages.

* cited by examiner

DELAYED READ INDICATION

BACKGROUND

A computing device can include a processor to perform computation tasks and memory media to store data. The processor can issue a load operation to read data from the memory media. The processor can also issue a store operation to write data to the memory media.

BRIEF DESCRIPTION OF THE DRAWINGS

Some implementations are described with respect to the following figures.

DETAILED DESCRIPTION

Figure 1:
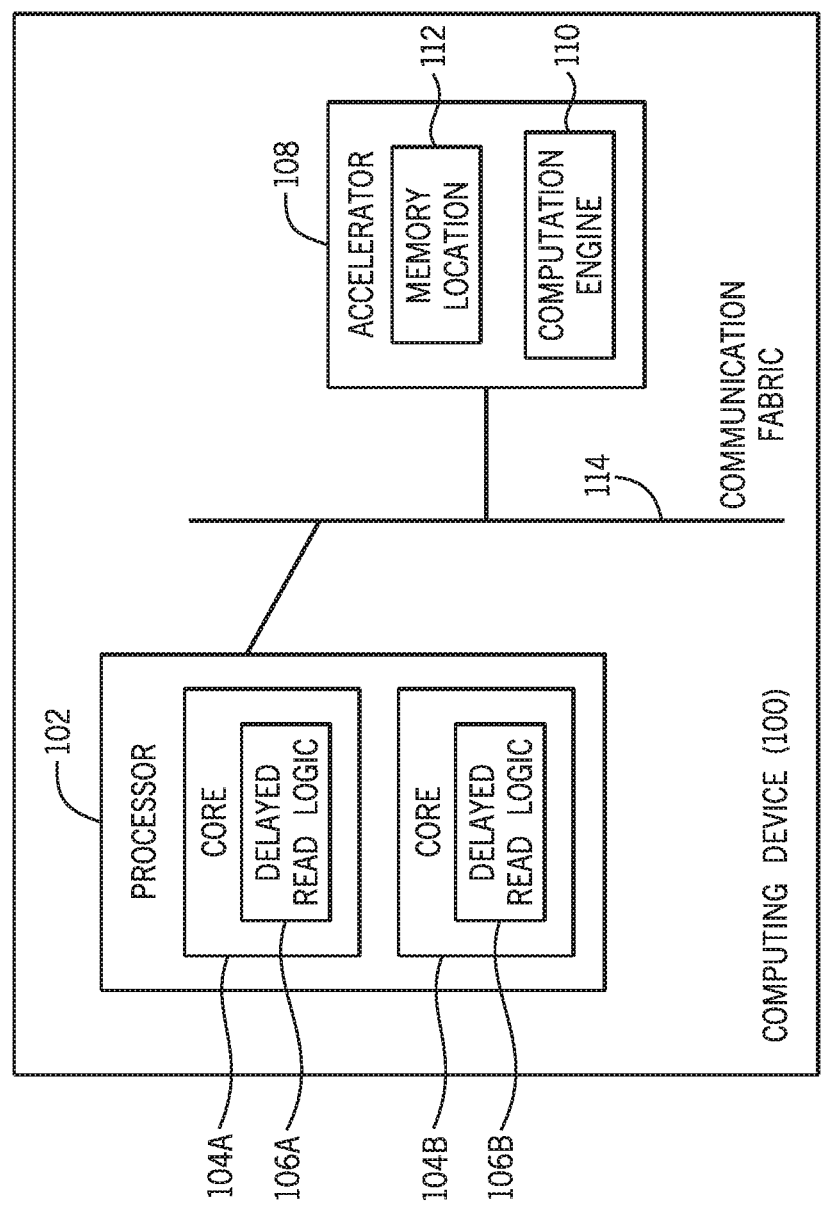
FIG. 1 is a block diagram of an example computing device according to some implementations.

In a computing device, to provide for improved processing throughput, an accelerator can perform certain computations on behalf of a processor in the computing device. An "accelerator" can refer to any computation component distinct from core logic of the processor that can perform computations in response to requests from the processor core logic. The core logic of the processor can include one or multiple processor cores that each includes an execution engine to execute instructions. A processor core can also include other resources, including cache memory, a bus interface, registers, and so forth.

An accelerator can be a discrete device, such as a microcontroller, a digital signal processor, a microprocessor, an application specific integrated circuit (ASIC) device, a programmable gate array (PGA), and so forth. In other examples, the accelerator and the core logic of the processor can be integrated into one module (e.g. integrated circuit chip or circuit board). In further examples, the accelerator can be provided as part of a memory module that includes memory media for storing data. The memory media can include one or some combination of the following: a dynamic random access memory (DRAM), a static random access memory (SRAM), a flash memory, a phase change memory, a memristor memory, a disk-based storage media, and so forth.

Examples of computations that can be performed by an accelerator include any or some combination of the following: encryption of data, decryption of data, compression of data, decompression of data, or any other operation or series of operations.

In some cases, an accelerator may take some arbitrary period of time to perform requested computations. The amount of time taken by the accelerator to perform requested computations can be non-deterministic, which means that the requester (e.g. a processor) is unable to determine when a response from the accelerator may be expected. Stated differently, the responding component, in this case the accelerator, is unable to respond to a request for a computation within a deterministic amount of time (i.e. within a predefined amount of time). In other examples, a requester can request a different type of responding component to perform a specified computation, which can take a non-deterministic amount of time.

While waiting for a result of a requested operation, a processor may "spin wait" for the response. Spin waiting for a response refers to a process in which the processor repeatedly checks to determine whether a condition has occurred, where the condition in this case includes the completion of the requested computation such that a result can be provided by the responding component (e.g. the accelerator). The processor can periodically issue polling requests to the accelerator while the processor is spin waiting. As another example, the polling requests can be issued by the processor based on use of a counter, where a polling request is sent when the counter has advanced by some number of count. The polling requests that are repeatedly sent can include read requests. In response to each repeatedly sent read request, the accelerator can issue a read response that contains an indicator that the result is not yet ready. The repeated communications of the read requests and corresponding read responses consumes power and is wasteful of the communication resources of a communication fabric between the processor and the accelerator. The increased communication fabric traffic can negatively impact other communication fabric operations.

Moreover, processing resources of both the processor and the accelerator are consumed due to communications of the repeated read requests and corresponding read responses. In addition, while the processor is spin waiting, the processor is unable to perform other activities.

In accordance with some implementations, the repeated polling for determining whether a responding component (such as an accelerator) has completed its computations can be avoided by sending a delayed read indication. The delayed read indication can be in the form of a delayed read request that can be sent from the requester (e.g. a processor) to the responding component (e.g. an accelerator). In other examples, the delayed read indication can be included as part of another request, such as a request sent from the requester to the responding component to perform a specified computation.

The delayed read indication indicates that a result of a requested computation (as requested by the requester of the responding component) is not to be returned to the requester from the responding component until a data value at a target address of the delayed read indication has changed. The delayed read indication can be associated with a target address at which data resulting from the requested computation is to be placed. The target address of the delayed read indication can be a memory address that identifies a memory location. This memory location is used to store the result of the requested computation once the computation is complete. A change in the data value at this memory location, as specified by the target address, indicates that the result of the computation or another response can be sent from the responding component back to the requester, in response to the delayed read indication.

The delayed read indication indicates to the responding component that the requester is able to handle a situation where a response to a request to perform a computation is returned in a non-deterministic amount of time. As a result, the responding component is able to perform the requested computation, and to return the result of the computation when ready (e.g. the data value at the target address has changed).

Stated differently, when the requester sends a delayed read indication, the requester expects that an amount of time for a result of the computation to be returned to the requester from the responding component in response to the delayed read indication is non-deterministic.

FIG. 1 is a block diagram of an example computing device 100. Examples of the computing device 100 can include a computer (e.g. a desktop computer, notebook computer, tablet computer, server computer, etc.), a handheld device (e.g. a smartphone, personal digital assistant, etc.), a game appliance, a storage system, a communication node, and so forth.

The computing device 100 includes a processor 102. In the example of FIG. 1, the processor 102 is a multi-core processor that includes multiple cores 104A and 104B. In the ensuing discussion, reference to a "core 104" is a reference to any of the cores 104A, 104B. In other examples, the processor 102 can be a single-core processor. Each core 104 of the processor 102 includes processing resources, including an execution engine to execute instructions, cache memory, registers, a bus interface, and so forth. More generally, a processor 102 can include a "processing engine," where the processing engine can include a core or multiple cores, and instructions executing in each core.

As further depicted in FIG. 1, each of at least some of the cores 104A, 104B includes a delayed read logic 106A or 106B, which is able to issue a delayed read indication according to some implementations. In the ensuing discussion, reference to a "delayed read logic 104" is a reference to any of the delayed read logic 106A, 106B. The delayed read indication can be issued by the delayed read logic 106 to an accelerator 108, which may have been requested by the respective processor core 104 to perform a specified computation. The accelerator 108 includes a computation engine 110 to perform the requested computation, which can include data encryption, data decryption, data compression, data decompression, or any other operation or series of operations.

The accelerator 108 also includes a memory location 112, which can be identified by a target address. Note that the memory location 112 can be in a queue, a register, a cache memory, or any other storage capable of storing data in the accelerator 108. Although just one memory location 112 is shown, it is noted that multiple memory locations can be included in the accelerator 108, with the multiple memory locations identified by respective target addresses. The memory location 112 can be used to store a result of a requested computation as performed by the computation engine 110 or another response. When a data value at the memory location 112 specified by the target address changes, then that is an indication that the result of the computation or another response can be returned from the accelerator 108 to the requesting processor core 104.

The processor 102 and the accelerator 108 are coupled over a communication fabric 114. In some examples, the communication fabric 114 can be a memory fabric. In such examples, communication among components coupled to the memory fabric can employ a protocol that specifies that transactions between components over the memory fabric employ memory addresses. The interface provided by the memory fabric can be an asynchronous interface, over which requests and transactions can be provided in an asynchronous manner. The asynchronous characteristic of the communication fabric 114 allows for use of the delayed read operation initiated by the sending of a delayed read indication. In addition, the asynchronous nature of the communication fabric 114 allows for a result of a requested computation performed by the accelerator 108 to be returned to the processor 102 in an amount of time that is non-deterministic.

In a traditional memory link between a requester and a memory device, the response to a memory request (e.g. a read request or write request) is expected within a deterministic amount of time. If such a response is not returned within the deterministic amount of time, then an error results. However, with the communication fabric 114 according to some implementations, asynchronous request-response transactions are supported between a requester and a responding component, which supports the use of delayed read operations initiated by delayed read indications in cases where the responding component is unable to respond to a request in a deterministic amount of time.

Figure 2:
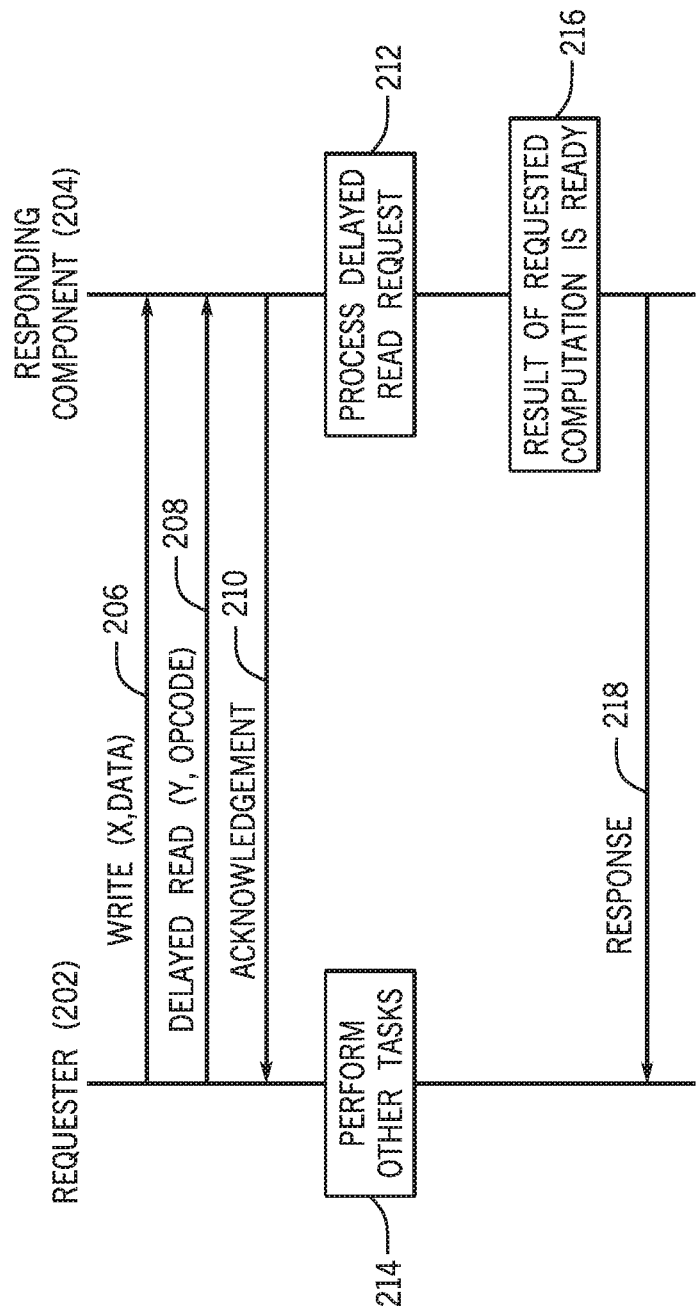
FIG. 2 is a message flow diagram of an example process according to some implementations.

FIG. 2 is a message flow diagram of a process between a requester 202 and a responding component 204. An example of the requester 202 is a processor core 104 of FIG. 1. An example of the responding component 204 is the accelerator 108 of FIG. 1.

The requester 202 sends (at 206) a write request to the responding component 204, to trigger the responding component 204 to perform a requested computation. The write request contains an address X and data that is to be used by the responding component 204 in performing the requested computation. The address X specifies the location at which the data is to be stored.

The requester 202 further sends (at 208), in conjunction with the write request sent at 206, a delayed read request to the responding component 204. In the example of FIG. 2, the delayed read request is sent to a target address Y, which identifies the memory location 112 where a result of the requested computation performed by the computation engine 110 in the accelerator 108 is to be posted.

In some examples, the delayed read request is a read request that has a special indicator, such as a specific Opcode (or operational code). The Opcode of the read request can be set to one of multiple values, where a predefined one of the multiple values indicates that the read request is a delayed read request. If the Opcode field is not set to the predefined value, then the read request can be a normal read request, where a response is expected within a deterministic amount of time.

In other examples, instead of using an Opcode, a delayed read request can be indicated as a read request that targets an address within a predefined address range. In other words, a read request that contains a target address within the predefined address range is a delayed read request. A read request with a target address that is outside of the predefined address range is a normal read request.

Although FIG. 2 shows an example in which multiple requests (the write request sent at 206 and the delayed read request sent at 208) are used, it is noted that in other examples, one request can be used to request a specified computation and to provide a delayed read indication.

As further depicted in FIG. 2, the responding component 204 sends (at 210) an acknowledgement of the delayed read request to the requester 202. This acknowledgement indicates that the delayed read request has been reliably delivered.

The responding component 204 understands that a delayed read request is to be handled differently than a normal read request. The responding component 204 is able to process (at 212) the delayed read request by waiting until a data value at the target address (Y) is changed before the responding component 204 returns a result of the requested computation to the requester 202.

Upon receiving the acknowledgement sent at 210, the requester 202 can perform (at 214) other tasks, including further transactions between the requester 202 and the responding component 204.

After a non-deterministic amount of time, the result of the requested computation is ready at the responding component 204, as indicated at 216. The result of the requested computation is ready when the responding component 204 detects that a data value at the target address (Y) of the delayed read request has changed.

The responding component 204 then sends (at 218) a read response that contains the result of the requested computation, to the requester 202.

In some examples, such as in the context of the computing device 100 of FIG. 1, a core 104 that has issued the delayed read request (at 208 in FIG. 2) and that has received the acknowledgement (at 210) is able to perform other actions. For example, a core 104 of the processor 102 of FIG. 1 can support multiple hardware threads. The core 104 can implement multiple logic processors (also referred to as hardware threads). Each logical processor or hardware thread is able to share the processing resources of the core 104 with another logical processor or hardware thread. The core 104 can include cache memory and registers to store the context for each hardware thread. An active hardware thread can employ the execution engine of the core 104 to execute instructions. During times when a first hardware thread is not executing instructions, the instructions of a second hardware thread can be executed on the execution engine of the core 104, by performing a context switch for the hardware threads. Note that the context switch between hardware threads at a processor core 104 does not involve higher level machine-readable instructions of the computing device 100, such as an operating system.

In such an example arrangement, when a first hardware thread of a given processor core 104 detects a stall condition, such as when a response is not received within some specified amount of time, the first hardware thread can issue a delayed read request (such as 208 in FIG. 2) to address the stall condition. A context switch can then be performed between the first hardware thread and a second hardware thread to allow the second hardware thread to use the given processor core 104 to perform tasks of the second hardware thread. Thus, while the first hardware thread is waiting for the response to its request, the resources of the given processor core 104 can be used by the second hardware thread, which improves efficiency in usage of the resources of the given processor core 104.

More generally, a core 104 of the processor 102 can perform other tasks after issuing the delayed read request, such that the core 104 is not idly waiting for a response from the accelerator 108.

At the responding component 204, the delayed read request can be tracked in a number of different ways. For example, the delayed read request can be enqueued in a pending execution queue until the result is generated, at which time the responding component 204 locates the delayed read request in the pending execution queue (such as by using the delayed read request transaction's tag field for correlation) and schedules the read response.

Figure 3:
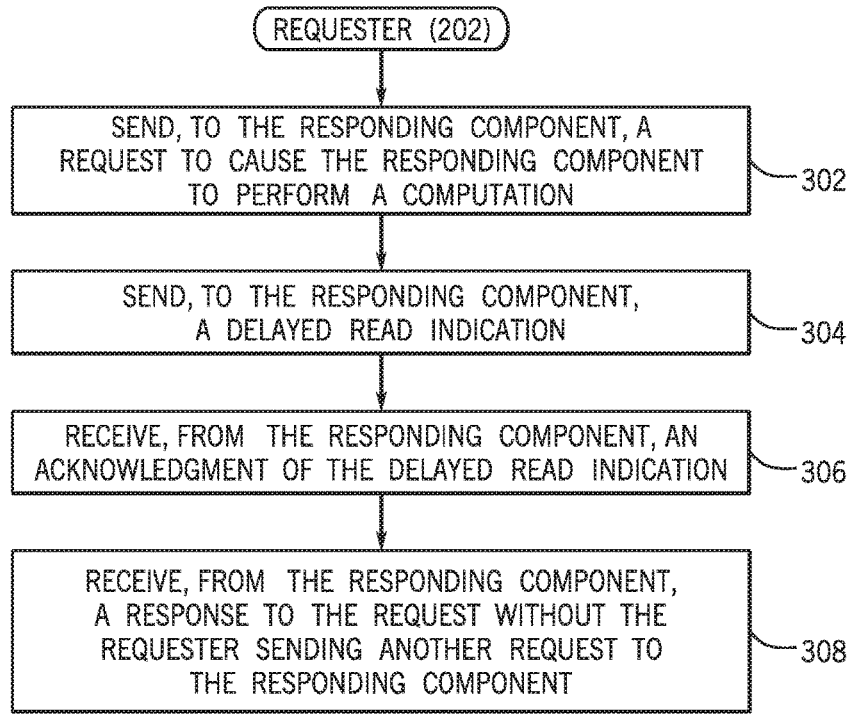
FIG. 3 is a flow diagram of an example process involving a requester and a responding component, according to some implementations.

FIG. 3 is a flow diagram of a process that can be performed by a requester, according to some examples. The requester 202 sends (at 302) to the responding component 204, a request to cause the responding component 204 to perform a computation. The requester 202 also sends (at 304), to the responding component 204, a delayed read indication, such as the delayed read request sent at 204 in FIG. 2. The delayed read indication indicates that the result of the computation is not to be returned to the requester 202 from the responding component 204 until a data value of a target address of the delayed read indication has changed. In other examples, upon issuing the delayed read indication, the requester expects that an amount of time for a result of the computation to be returned to the requester from the responding component in response to the delayed read indication is non-deterministic.

The requester receives (at 306), from the responding component 204, an acknowledgement of the delayed read indication. After receiving the acknowledgement, the requester 202 receives (at 308), from the responding component 204, a response to the request without the requester 202 sending another request to the responding component 204. More specifically, after sending the delayed read indication, the requester 202 does not have to send further polling requests or perform retries to obtain the response to the request sent at 302.

By using techniques or mechanisms according to some implementations, more efficient usage of processing and storage resources can be achieved in situations where computations are performed in a non-deterministic amount of time. The more efficient usage of resources is achieved due to reduced traffic over a communication fabric, and fewer processing of reads and responses. A requester that is waiting for completion of a computation by a responding component can perform other tasks while waiting for the completion of the computation.

In further implementations, the delayed read operation as discussed above can be applied in the context of interrupt processing. Traditionally, in response to an interrupt, an interrupt service routine is executed by a computing device. The interrupt service routine can then turn off further interrupts to address the concern of unbounded execution times of an interrupt service routine. Turning off further interrupts would cause input/output (I/O) devices to write to specific memory locations to indicate further interrupts from the I/O devices. A processor can poll these specific memory locations to see what interrupts are pending. As discussed above, such repeated polling by a processor can be inefficient.

Figure 4:
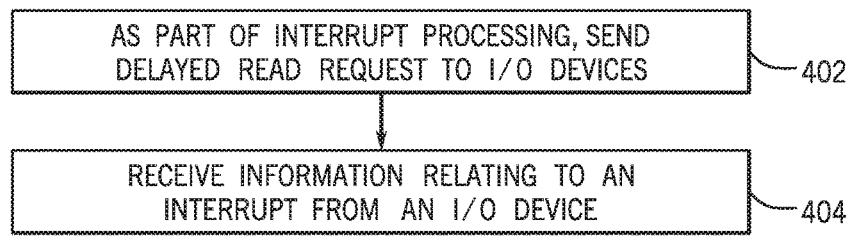
FIG. 4 is a flow diagram of an example interrupt processing according to some implementations.

In accordance with some implementations, as shown in FIG. 4, instead of the processor polling the I/O devices during interrupt processing (in response to an interrupt) to determine what interrupts are pending, the processor can instead send (at 402) delayed read requests to the I/O devices. The delayed read requests can be sent to a specific address to indicate that each I/O device is to respond if the I/O device wishes to issue an interrupt. When an I/O device has information relating to an interrupt to send to the processor, the I/O device can then respond to the delayed read request by sending such information to the processor, which is received (at 404) by the processor.

The delayed read logic 106 and computation engine 110 depicted in FIG. 1 can be implemented with hardware processing circuitry or as a combination of machine-readable instructions and hardware processing circuitry. The machine-readable instructions can be executed on the hardware processing circuitry.

Storage media can be used to store machine-readable instructions, where the storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
sending, by a requester in a computing device to a responding component, a request to cause the responding component to perform a computation;
sending, by the requester to the responding component, a delayed read indication, wherein the delayed read indication indicates that a result of the computation is not to be returned to the requester from the responding component until a data value at a target address of the delayed read indication has changed;
receiving, by the requester from the responding component, an acknowledgment of the delayed read indication; and
after receiving the acknowledgment, receiving a response to the request without the requester sending another request to the responding component.

2. The method of claim 1, further comprising:
performing, by the requester, another task while awaiting the response to the request from the responding component.

3. The method of claim 1, wherein the responding component comprises an accelerator to perform the computation on behalf of the requester.

4. The method of claim 3, wherein the computation comprises one of encrypting data, decrypting data, compressing data, and decompressing data.

5. The method of claim 1, wherein sending the delayed read indication comprises sending a read request separate from the request to cause the responding component to perform the computation.

6. The method of claim 5, wherein the read request includes a field settable to a first value to provide the delayed read indication, and settable to a second, different value to indicate that the read request does not include the delayed read indication.

7. The method of claim 1, wherein sending the request and sending the delayed read indication are part of interrupt processing responsive to an interrupt.

8. The method of claim 1, wherein the requester comprises a core of a processor that includes a plurality of cores.

9. The method of claim 1 wherein the requester includes a processor and an accelerator and a communication fabric between the processor and the accelerator, the communication fabric supporting asynchronous transactions.

10. A requester comprising:
a processor having a plurality of cores, the processor to:
send, to a responding component, a request to cause the responding component to perform a computation;
send, to the responding component, a delayed read indication, wherein the requester expects that an amount of time for a result of the computation to be returned to the requester from the responding component in response to the delayed read indication is non-deterministic, wherein the delayed read indication indicates that a result of the computation is not to be returned to the requester from the responding component until a data value at a target address of the delayed read indication has changed;
receive, from the responding component, an acknowledgment of the delayed read indication; and
after receiving the acknowledgment, receive a response to the request without the requester sending another request to the responding component.

11. The requester of claim 10, wherein the processor includes a first core.

12. The requester of claim 11, wherein the processor further includes a first hardware thread executing in the first core, and wherein the sending of the delayed read indication is performed by the first hardware thread.

13. The requester of claim 12, wherein the processor further includes a second hardware thread, and wherein the second hardware thread is executable on the first core to perform a task of the second hardware thread while the first hardware thread waits for completion of the computation.

14. The requester of claim 10, the requestor to perform another task while awaiting the response to the request from the responding component.

15. The requestor of claim 10, wherein the computation comprises one of encrypting data, decrypting data, compressing data, and decompressing data.

16. The requestor of claim 10 wherein sending the delayed read indication comprises sending a read request separate from the request to cause the responding component to perform the computation.

17. The requestor of claim 16, wherein the read request includes a field settable to a first value to provide the delayed read indication, and settable to a second, different value to indicate that the read request does not include the delayed read indication.

18. The requestor of claim 10 wherein sending the request and sending the delayed read indication are part of interrupt processing responsive to an interrupt.

19. A computing device comprising:
a processor; and
an accelerator,
the processor to:
send, to the accelerator, a request to cause the accelerator to perform a computation;
send, to the accelerator, a delayed read indication that specifies a target address, wherein the delayed read indication indicates that a result of the computation is not to be returned to the processor from the accelerator until a data value at the target address has changed;
the accelerator to:
send, to the processor, an acknowledgment of the delayed read indication; and
after sending the acknowledgment, detect that the data value at the target address has changed; and in response to the detecting, send a response to the request without receiving another request from the processor for the response.

20. The computing device of claim 19, further comprising a communication fabric between the processor and the accelerator, the communication fabric supporting asynchronous transactions.

* * * * *